United States Patent [19]
Enderlein et al.

[11] Patent Number: 5,819,906
[45] Date of Patent: Oct. 13, 1998

[54] SUSPENSION CONVEYOR INSTALLATION

[75] Inventors: Robby Enderlein, Lansberg a. Lech; Johann Robu, Olching, both of Germany; Hansjörg Geiger, Schwaz, Austria

[73] Assignee: MTS Modulare Transport Systeme GmbH, Vomp, Austria

[21] Appl. No.: 727,491
[22] PCT Filed: Jun. 14, 1995
[86] PCT No.: PCT/EP95/02312
§ 371 Date: Oct. 7, 1996
§ 102(e) Date: Oct. 7, 1996
[87] PCT Pub. No.: WO95/34452
PCT Pub. Date: Dec. 21, 1995

[30] Foreign Application Priority Data

Jun. 15, 1994 [DE] Germany ............................ 9409663 U

[51] Int. Cl.⁶ .................................................... B65G 17/00
[52] U.S. Cl. ................... 198/687.1; 198/685; 104/172.4; 104/172.5
[58] Field of Search .................................... 198/685, 687, 198/465.4; 104/172.1, 172.3–172.5

[56] References Cited

U.S. PATENT DOCUMENTS 3,242,875  3/1966  Burrows ................................ 104/172.4
3,389,662  6/1968  Jacoby .................................. 104/172.5

FOREIGN PATENT DOCUMENTS

2 028 057  10/1970  France .
26 34 519  10/1977  Germany .
  980 358   1/1965  United Kingdom .
2 038 743   7/1980  United Kingdom .

Primary Examiner—William E. Terrell
Assistant Examiner—Mark Deuble
Attorney, Agent, or Firm—Lyon & Lyon LLP

[57] ABSTRACT

A suspension conveyor installation having rollers (4) which are selectively linked to a drive chain (16) by driver elements (13). The driver elements (13) are arranged as link plates on the pins (15) of the drive chain (16) so as to be pivotable with respect to each other about vertical axes perpendicular to the drive chain (16), thereby allowing the driver elements (13) to flex when rounding sharp turns in the suspension conveyor installation. The bottom edge of each driver elements (13) has an oblique lifting ramp 18 at its leading edge, a glider surface (19) adjoining the lifting ramp (18), and a driver recess (20) adjoining the glider surface (19). In operation, drive receiving elements (11) on the rollers (4) are engaged by the drive recesses (20) on the driver elements (13) to move the rollers (4) with the drive chain (16) until the lifting ramp (18) contacts an obstacle (24) or an adjacent roller (4), at which point the driver elements (13) are lifted to disengage the rollers (4) from the drive chain (16).

11 Claims, 10 Drawing Sheets

SUSPENSION CONVEYOR INSTALLATION

The invention relates to a suspension conveyor installation comprising roller devices individually displaceable on a rail system, and a drive chain routed along said rail system and having driver elements engaging the roller devices.

The suspension conveyor installation may in particular constitute an installation for sorting objects suspended from respective roller devices, e.g. for sorting coat hangers suspended from respective roller devices with each coat hanger carrying clothes. In such a sorting installation, the objects are either conveyed or they are accumulated in stop paths. To ensure this operation, the driver elements have to be disengaged automatically from a roller device when the latter runs onto a stopped roller device or is to be stopped on its own.

The invention solves the problem of providing a driver mechanism allowing the driver elements to automatically engage and release roller devices that are to be entrained, said driver mechanism permitting a guidance as flexible as possible while being adaptable to varying requirements in a modular manner.

The invention solves said problem by the features that the top ends of the roller devices facing the drive chain each comprise a respective drive receiving element, wherein in the engaged position a driver element engages a respective drive receiving element while being disengaged from the drive receiving element in the disengaged position. The length of the driver elements, as measured in the conveying direction, exceeds the dimension of the roller devices as measured in the conveying direction. The driver elements are arranged as driver plates in the form of link plates mounted to the drive chain such as to be displaceable vertically upwards toward the drive chain, with the links of the link plates being pivotable with respect to each other about axes perpendicular to the drive chain; however, all the links can be displaced towards the drive chain only collectively and parallelly to themselves. The bottom edge, facing away from the drive chain, of each driver element comprises: a lifting ramp, arranged at the leading end of the driver element and extending obliquely with respect to the conveying direction, for lifting the driver element upon abutment; a glider surface, adjoining the lifting ramp and extending in the conveying direction, for maintaining the driver element lifted; and a driver recess, adjoining the glider surface, for receiving the drive receiving element of the respective roller device; wherein in the normal conveying operation, the driver element and the drive receiving element engage each other, thus being in their engaged position, whereas the disengaged position is established or maintained, respectively, by the lifting ramp abutting onto an obstacle or an adjacent roller device, and by the glider surface gliding on said obstacle or on the top end of an adjacent roller device.

Therefore, when the drive receiving element of a roller device is engaged in the driver recess of one of the driver elements, and thus entrained by the latter, the driver element will be urged upwards by a stopper arrangement or by a stopped roller device, in particular by the drive receiving element thereof, when the lifting ramp of the plate-shaped driver abuts onto an obstacle—such as said stopper arrangement or said drive receiving element of the stopped roller device—obstructing the path of the driver element, resulting in the driver recess, and thus the driver element, being released from the drive receiving element of the roller device previously entrained. While passing the stopped roller devices and the stopper arrangement, the particular driver plate is then maintained in the disengaged position because the drive receiving elements of the stopped roller devices, or the stopper arrangement, glide on the glider surface of the driver element until the driver element has passed the stopping arrangement. Thereafter, the driver plate is returned to its engaging position by means of a return spring, or by its own weight, in order to automatically entrain the next roller device. When the driver plate in this engaging position runs onto the drive receiving element of a roller device to be conveyed, the driver plate is first elevated again to the disengaged position by the drive receiving element abutting onto the lifting ramp of the driver plate, until the drive receiving element is overtaken by the driver recess whereby the driver plate is returned to the engaged position, with the drive receiving element being received in the driver recess.

On the one hand, an installation for conveying transport hooks suspended from a trolley conveyor is disclosed as such in DE-A-38 12 023, wherein a drive chain extends above the trolley conveyor and carries driver plates each comprising an oblique lifting ramp at the leading end of the plate, an adjoining glider surface, and an adjoining driver recess. In this installation, however, the driver plates are firmly affixed to the drive chain; hence, measures have to be taken to allow the drive chain to escape upwards when the driver plate runs onto transport hooks waiting at a standstill. Therefore, such a conveyor installation cannot be used if the drive chain cannot give way, as in the type of suspension conveyor installation according to the invention. Moreover, the prior art installation does not provide for roller devices comprising drive receiving elements for co-operation with the driver plates.

In another conventional conveyor installation, the driver elements are designed as rigid plates, the leading ends of which are pivotably mounted to the drive chain. Each time the drive chain of this installation travels through a curve, the driver element has to swivel out of the curve, which requires considerable construction space; thus, the possible radius of curvature of the drive chain route cannot be chosen as small as desired.

The invention obviates these drawbacks in particular by the abovementioned features that the driver elements are designed in the form of link plates mounted to the drive chain such as to be displaceable vertically upwards toward the drive chain, wherein the links of the link plates are pivotable with respect to each other about axes perpendicular to the drive chain, but can be displaced only collectively towards the drive chain. According to this embodiment, the driver plate is neither swivelled into the engaging position nor swivelled out of the engaging position, but will be moved out of the engaging position by straight vertical lifting, and moved into the engaging position by straight vertical lowering. In addition, the driver element can conform to any small radius of curvature, through which the drive chain passes, without swivelling out of the curved path.

The particular drive receiving element may be arranged as a drive receiving reel formed on the top end of the roller device and rotatable about a horizontal axis. Arranging the drive receiving element in the form of a reel provides the advantage that only little friction is produced when the driver elements overtake the roller devices. Further, it is ensured that drive receiving elements in the form of reels can readily engage and release, respectively, the driver element, in particular the driver recess.

According to a presently preferred embodiment, however, the drive receiving element is designed as a drive receiving projection formed on the top end of the roller device. This embodiment provides the advantage that the driver element and the drive receiving element can be caused to firmly engage each other, allowing great conveying forces to be transferred from the drive chain to the roller devices through the driving and drive receiving elements.

An advantageous development provides the features that, starting from the leading end of the driver element, the lifting ramp and the succeeding glider surface are followed by a pass ramp and finally by a driver hook, with the driver recess extending between the pass ramp and the driver hook. In this arrangement, a second lifting ramp is advantageously disposed at a trailing end of the respective driver element behind the driver hook. Such a design of the driver element ensures that both the driver element can readily overtake roller devices, and roller devices can readily overtake the driver elements, which may be necessary, for example, if the drive chain is at a standstill due to a technical failure.

In accordance with another embodiment, a further glider surface—in addition to the first mentioned glider surface—may be arranged at the trailing rear end of the driver element behind the driver recess, in particular allowing to shorten the longitudinal dimension of the driver element.

According to a further advantageous embodiment, two respective roller devices are connected to each other by a lower connecting rod to form a tandem trolley. The connecting rod may be utilised as a transport rod for the goods to be conveyed, for example, clothes suspended from coat hangers.

In the case of the tandem trolley, the drive receiving elements of both roller devices are advantageously each designed as a hook-like drive receiving projection oriented obliquely upwards and towards the centre of the tandem trolley. This permits such tandem trolleys to be entrained in both directions by an abovedescribed driver element.

According to an advantageous embodiment of the invention, each of the two roller devices has only one set of coaxial stabilising rollers or only one stabilising roller. This is advantageous because in the tandem trolley design, a distance between the roller devices firmly interconnected through the connecting rod is ensured and, thus, one stabilising roller or one set of coaxial stabilising rollers, respectively, already provide sufficient tilting stability.

According to still another advantageous embodiment of the invention, the roller devices are connected to the connecting rod through coupling members adapted to engage corresponding coupling members of adjacent tandem trolleys in order to form a chain of tandem trolleys.

According to a particularly advantageous embodiment of the invention, the width of the drive receiving element, as measured perpendicularly to the conveying direction, is at least twice the width of the driver element. In this way, a plurality of driver elements can be guided in parallel, whereby for instance driver elements of three different paths branching from each other can be guided in parallel.

Preferred embodiments of the invention will be described in greater detail referring to the drawings in which.

Figure 1:
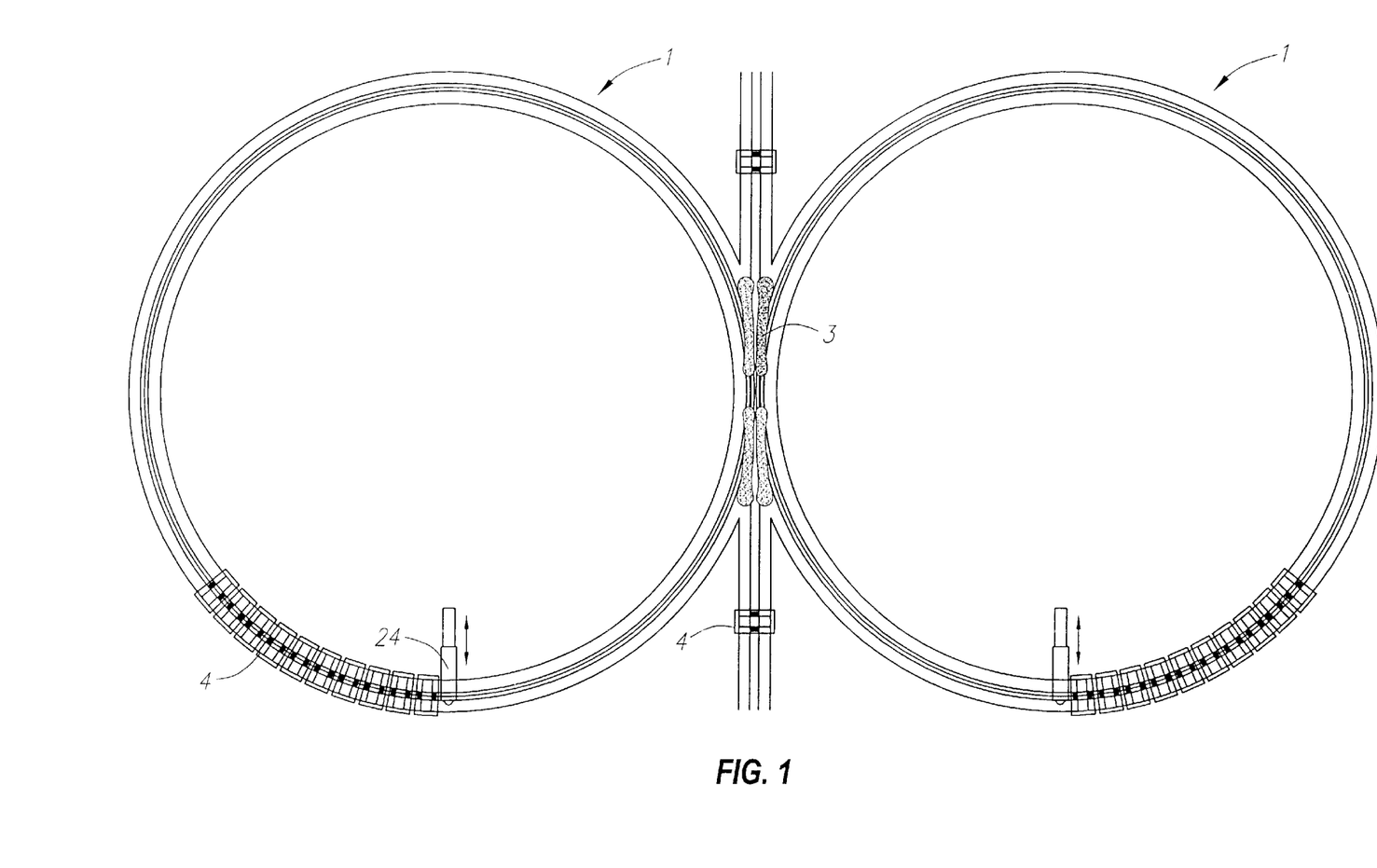
FIG. 1 is a largely schematic plan view of part of a rail system of the suspension conveyor installation.

FIG. 1 is a schematic representation of a plan view of part of a rail system in which two loop circuits 1 are connected to a straight path 2. Switch blades 3 are arranged to be switched in order to divert roller devices 4 (likewise shown schematically) from said path 2 into the loops 1, or to return the roller devices 4 from said loops 1 onto the path 2. According to the exemplary embodiment shown, two pairs of switch blades are provided, and the switch blades 3 of each pair extend substantially in parallel; it is also possible, however, to provide only one switch blade 3, for example, depending on the direction of travel and diversion of the roller devices 4.

As is further apparent, stoppers 24 are provided for stopping the roller devices 4 within the loops 1, causing the roller devices 4 to queue up, as will be explained below. As indicated in FIG. 1, the stoppers 24 may be arranged to be moved as obstacles into the path of travel of the roller devices 4 or retracted from said path in order to stop the roller devices 4 or to release them, respectively. It is also possible for switch blades 3 to be replaced by mere junctions; in this event, the invention ensures that no clogging occurs if two driver elements arrive at a junction at the same time, as will be described in greater detail below.

Figure 2A:
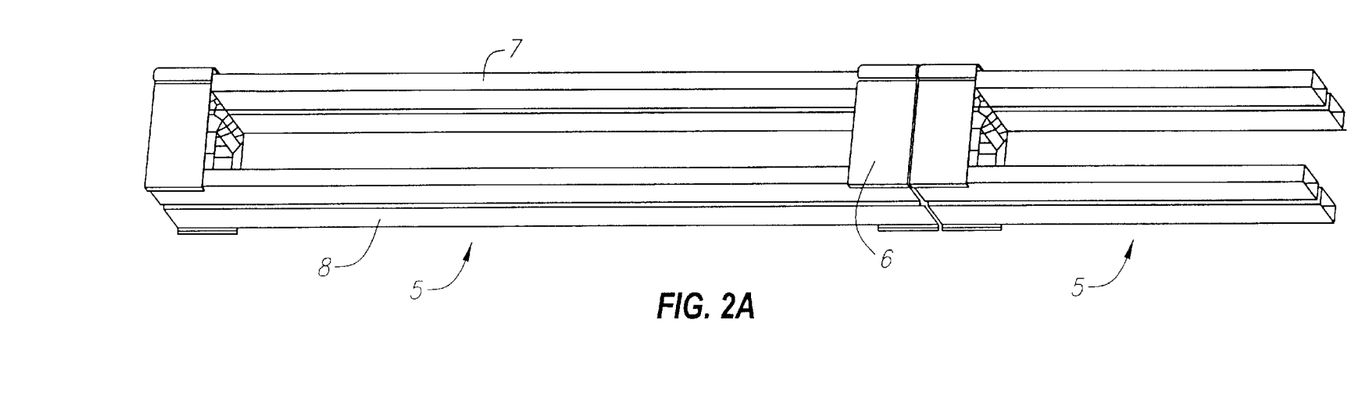
FIG. 2a) is a schematic perspective view of a rail portion.
Figures 2B, 2C:
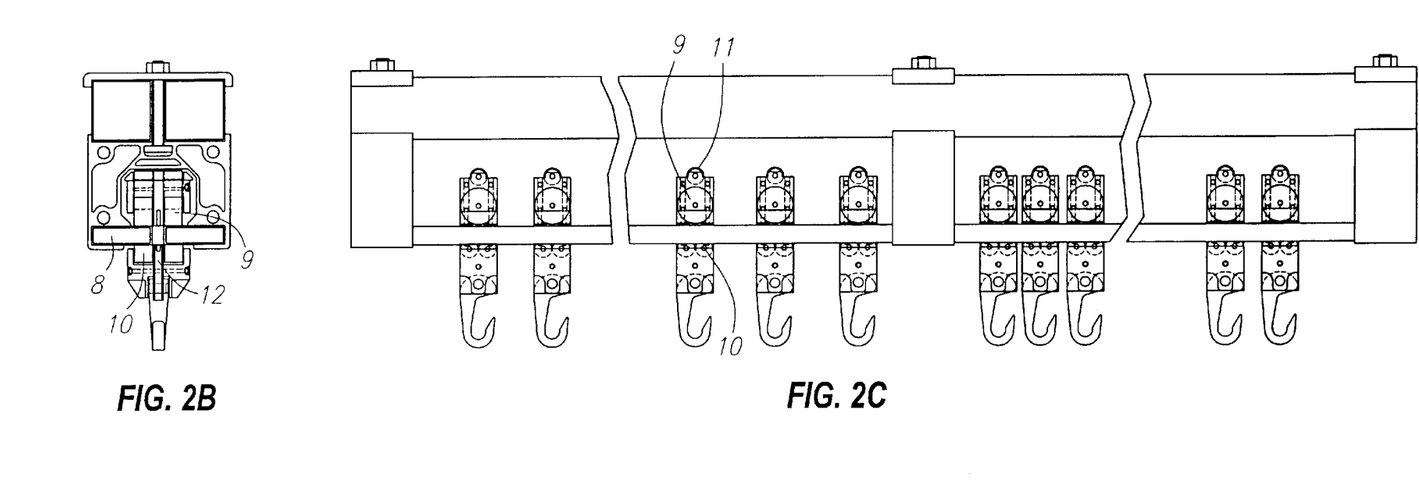
FIG. 2b) is a sectional view taken along line A-B in FIG. 2c)
FIG. 2c) is a side view of the rail portion shown in FIG. 2b), with roller devices inserted in the rail.

FIG. 2 schematically illustrates the structure of the rails, with FIG. 2a) showing a schematic perspective view of a rail portion which in this exemplary embodiment is composed of two path sections 5 screwed to one another through bridges 6. In this design, the rail comprises profiled support beams 7 and profiled travel beams 8 on which the carrying rollers 9 of roller devices 4 travel, as apparent from FIGS. 2b) and 2c). In this drawing, FIG. 2c) is a sectional view taken along line A-B in FIG. 2c), whereas FIG. 2c) is a side view of the rail with roller devices 4 travelling thereon. Stabilising rollers 10 engage a bottom travelling surface formed on the travel beams 8 to ensure smooth travelling of the roller devices 4, i.e. to prevent the roller devices 4 from rotating about a horizontal axis perpendicular to the direction of travel, which could impair the smooth running of the roller devices.

In addition, lateral guiding rollers 12 running between the profiled travel beams 8 provide for lateral guidance of the roller devices 4. As clearly seen in particular in FIG. 2c), the top ends of the roller devices 4 are provided with respective drive receiving elements 11 which can be engaged by the driver elements; the latter are not shown in FIG. 2c) but will be clearly illustrated and detailed in the subsequent drawing Figures.

Figure 3:
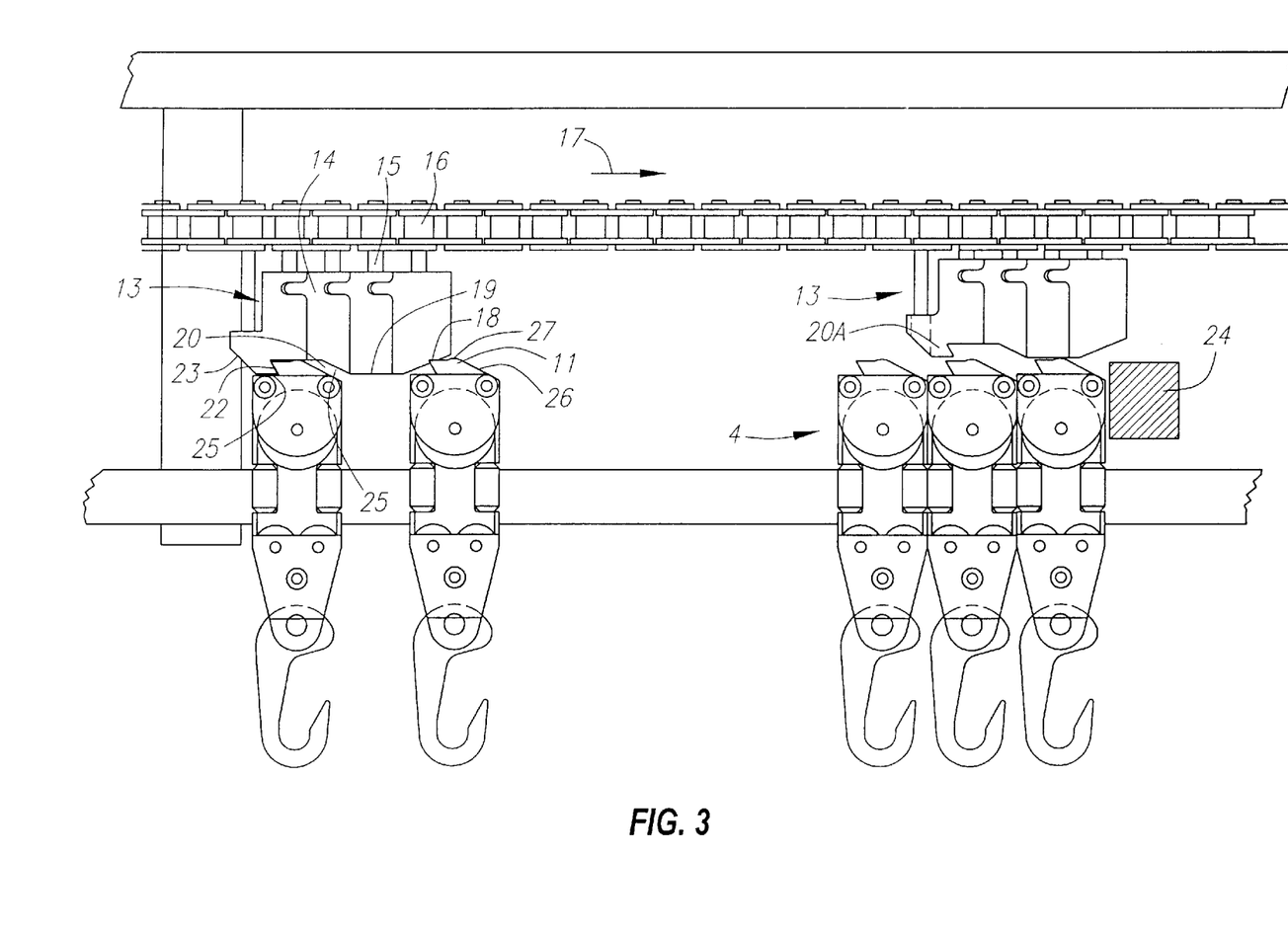
FIG. 3 is a side view, corresponding to that in FIG. 2c), of another embodiment on a larger scale, further illustrating the driver elements in their engaged and disengaged positions.

FIG. 3 is a side view corresponding to that in FIG. 2, illustrating another, particularly advantageous design of the drive receiving elements of the roller devices as well as an advantageous embodiment of the related driver element 13 in the form of a link plate.

On the left-hand side of FIG. 3, the driver element 13 is shown in its engaged state, while it is shown in its disengaged state on the right-hand side of the Figure. The driver element 13 is comprised of individual links 14 articulated to each other. The driver element, or its individual links 14, are mounted to the drive chain 16 through chain pins 15 and are vertically displaceable. The drive chain 16 may be pulled in the direction of travel indicated by an arrow 17, for example. The individual links 14 of the link plate forming the driver element can be moved only collectively upwards or downwards to the engaged or disengaged positions, respectively.

As is further apparent from FIG. 3, the driver element 13 is provided with an obliquely descending lifting ramp 18 for lifting the driver element 13 upon abutment, and with an adjoining glider surface 19, extending parallel to the drive chain 16, for keeping the driver element 13 in the lifted position. A driver recess 20 is arranged adjacent to the glider surface 19 and is confined, on the one hand, by a pass ramp 21 rising obliquely from the glider surface 19 and, on the other hand, by an inclined surface 22 of a driver nose 20a descending obliquely in the conveying direction. Finally, the trailing end of the driver element 13 is provided with a further pass ramp 23 rising obliquely, while a further short glider surface 25, extending along the driver nose 20a, for keeping the driver element 13 in the lifted position is arranged between said further pass ramp 23 and the inclined surface 22.

In the following, the operation of the suspension conveyor installation will be described in greater detail. In the engaged position, as shown in the left-hand part of FIG. 3, the driver recess 20 engages the drive receiving element 11, which in this exemplary embodiment is formed as a drive receiving projection. The hook-shaped drive receiving projection 11 comprises a sloped surface rising obliquely towards the trailing end of the roller device, which sloped surface seats on, and is entrained by, the inclined surface 22 of the driver element 13 in the engaged position. As indicated by arrow 17, the associated roller device 4 is automatically conveyed from the left-hand side to the right-hand side until the roller device 4 is stopped, for example, by a stopper 24 or another roller device 4 already at standstill. A roller device 4 approaching another roller device 4 already stopped is illustrated on the left-hand side of FIG. 3. In so doing, the lifting ramp 18 abuts onto the drive receiving element 11, i.e. in the present case onto a hook-shaped point of the drive receiving element 11 formed as a drive receiving projection 11. As the driver element 13 is conveyed on by the drive chain 16, the driver element 13 is pushed upwards until it finally reaches the disengaged position depicted on the right-hand side of FIG. 3. The glider surface 19 and the further glider surface 25 cooperate to make the driver element 13 glide over the stopper 24, or another roller device 4 already stopped, while the driver element 13 is held in the disengaged position and further conveyed in the direction of the arrow. As a result, roller devices 4 automatically delivered by respective driver elements 13 are effectively lined up, with the driver elements 13 disengaging automatically from the drive receiving elements 11. Hence, the driver elements 13 are enabled to overtake, or pass, the roller devices 4.

Conversely, the pass ramps 21 and 23 also allow the driver elements 13 to be passed by the roller devices 4. This is necessary in particular when the drive chain 16 comes to a standstill while the roller devices 4 are nevertheless to be conveyed further by hand. To this end, the drive receiving projection 11 is likewise provided with a lifting ramp 26 on the leading end of the top face of the roller device 4, said lifting ramp 26 descending obliquely towards the front end.

As will be appreciated, the glider surfaces 19 and 25 ride over the drive receiving elements 11, both when the driver elements 13 overtake the roller devices 4 and when the roller devices 4 overtake the driver elements 13. In particular, according to the present exemplary embodiment, the glider surfaces 19 and 25 may ride over a gliding member 27 arranged for this purpose on each drive receiving element 11.

Figures 4A, 4B:
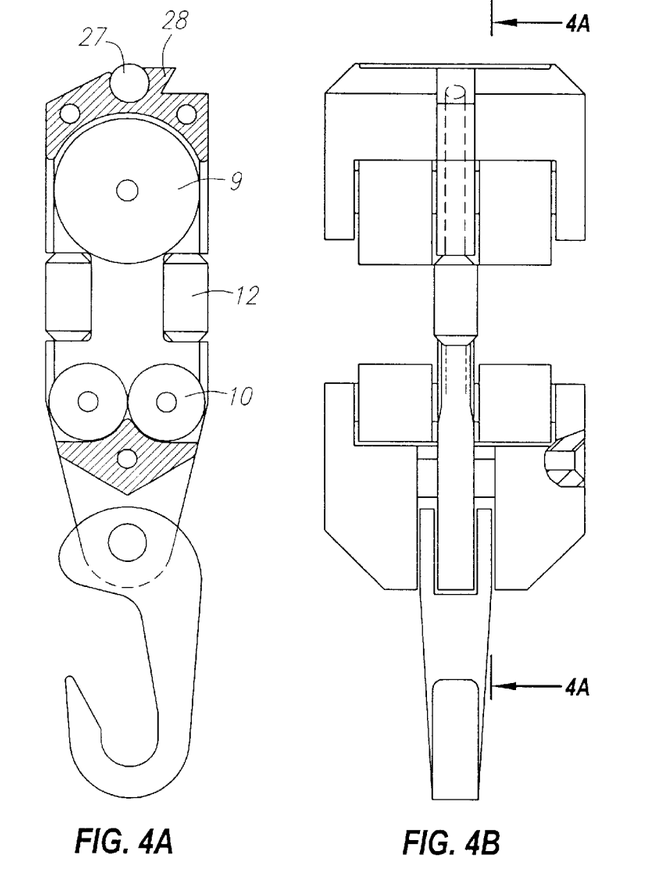
FIG. 4a) is a sectional view of the roller device shown in FIG. 3, taken along line C-D in FIG. 4b)
FIG. 4b) is a front view of the roller device shown in FIG. 3.
Figure 4C:
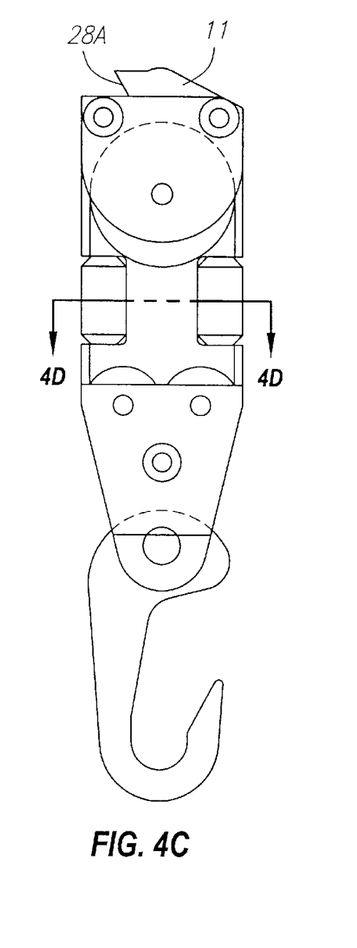
FIG. 4c) is a side view of the roller device shown in FIG. 3.
Figure 4D:
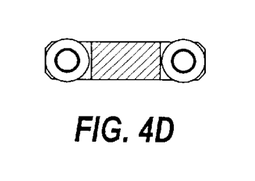
FIG. 4d) is a partial sectional view taken along line E-F in FIG. 4c)
Figure 4E:
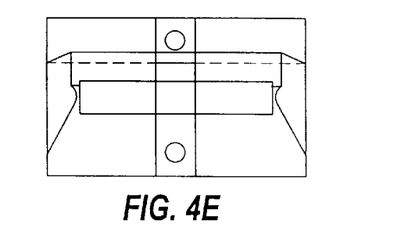
FIG. 4e) is a plan view of the roller device shown in FIG. 3.

The structure of the roller devices 4 according to this embodiment can be seen in greater detail in FIG. 4, wherein FIG. 4a) is a sectional view taken along line C-D in FIG. 4b), while FIG. 4b) is a front view of the roller device 4, FIG. 4c) is a side view of the roller device 4, FIG. 4d) is a sectional view taken along line E-F in FIG. 4c), and FIG. 4e) is a plan view of the roller device 4. The carrying rollers 9, stabilising rollers 10 and lateral guiding rollers 12 are particularly well visible in FIG. 4. Likewise, the drive receiving element 11 formed as a drive receiving projection is clearly apparent; the drive receiving projection is provided, on the one hand, with a drive receiving nose 28 comprising an inclined surface 28a rising obliquely towards the trailing end of roller device 4 and, on the other hand, with the gliding member 27. Like in the present embodiment, the gliding member 27 may be constituted by a simple, round metal pin embedded in the plastics casing of roller device 4.

When a roller device 4 is diverted—by a switch arranged at a branch point of the rail system—from one conveyor path to another conveyor path branching off the first one while being associated with a different drive chain, then the roller device can be disengaged automatically from the drive chain of the first conveyor path. This is achieved by the inclined surface 22 of the driver nose 20a of driver element 13 and the abovedescribed inclined surface 28a of drive receiving nose 28 on the roller device, which inclined surfaces 22 and 28a are seated on each other in the engaged position whereas the noses 20a and 28a are separated at the branch point by horizontal rotation relative to each other, since in the process of this relative rotation, the particular oblique side edge of inclined surface 22 glides off the inclined surface 28a, pushing the driver element 13 upwards and releasing it from the drive receiving nose 28 of roller device 4.

Figure 5:
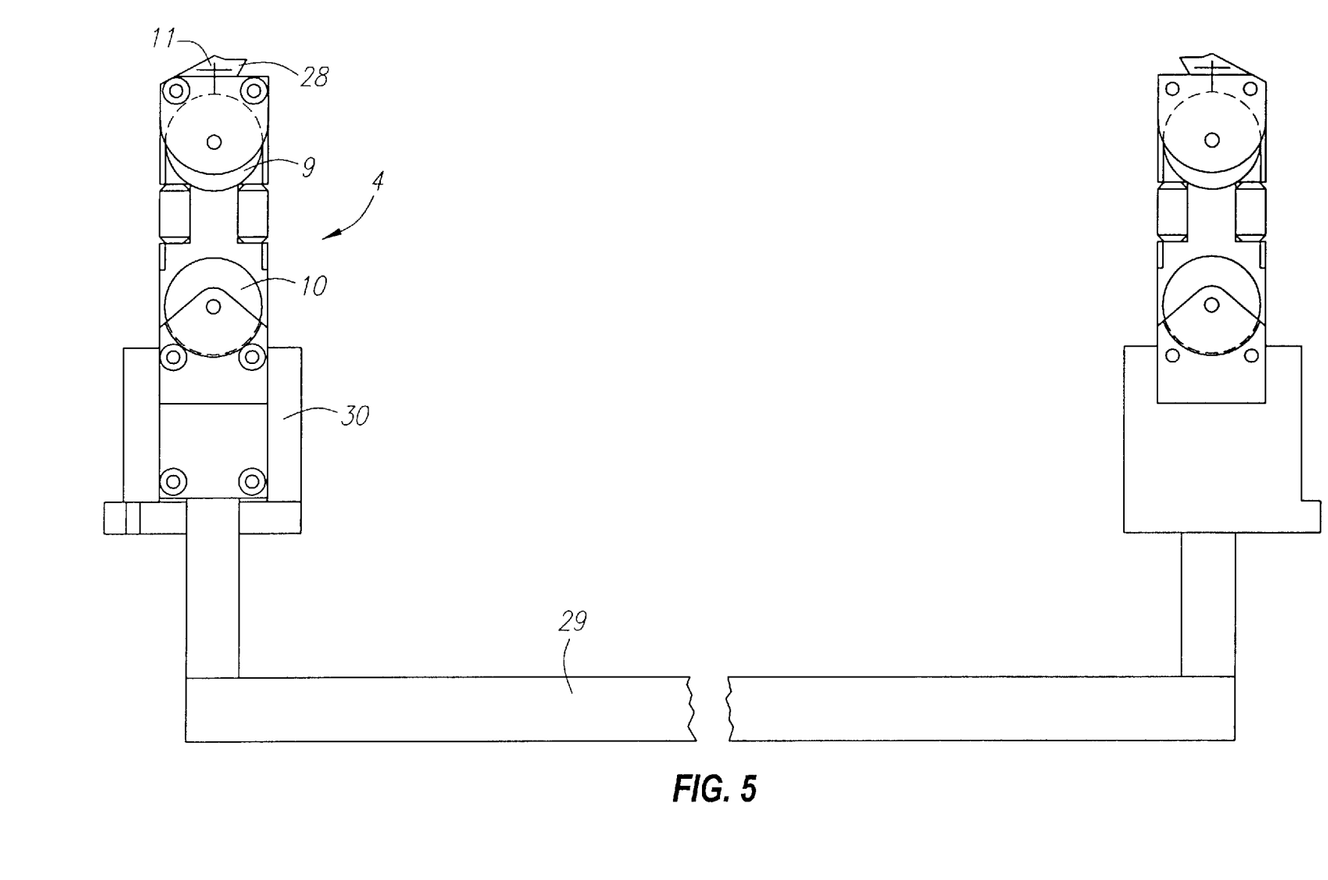
FIG. 5 is a side view of a tandem trolley.

FIG. 5 shows a further development of the aforementioned embodiment in the form of a so-called tandem trolley combining two roller devices 4 through a connecting rod 29 and respective rotatable coupling rods. In addition, coupling members 30 are provided which link the roller devices 4 to the connecting rod 29 and are arranged to intercouple several tandem trolleys, as will be explained in greater detail with reference to FIG. 6.

A peculiarity of this embodiment is that only one set of stabilising rollers 10 coaxial to one another is required for each roller device 4; for the sake of a simple construction, the design of said set of stabilising rollers 10 may be identical to that of the set of carrying rollers 9 coaxial to one another. The noses 28 of the drive receiving elements 11 are inclined upwardly and towards the centre of the tandem trolley so that the noses 28 of both roller devices 4 oppose each other. The tandem trolley can thus be driven in both directions by respective driver elements 13 (cf. FIG. 3). The connecting rod 29 serves to receive the load, for example, to receive coat hangers.

Figure 6A:
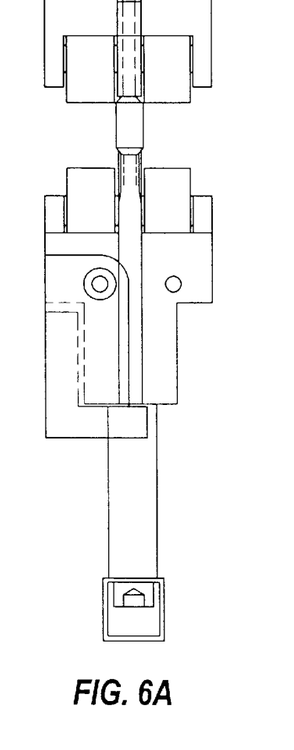
FIG. 6a) is a front view of the tandem trolley shown in FIG. 5.
Figure 6B:
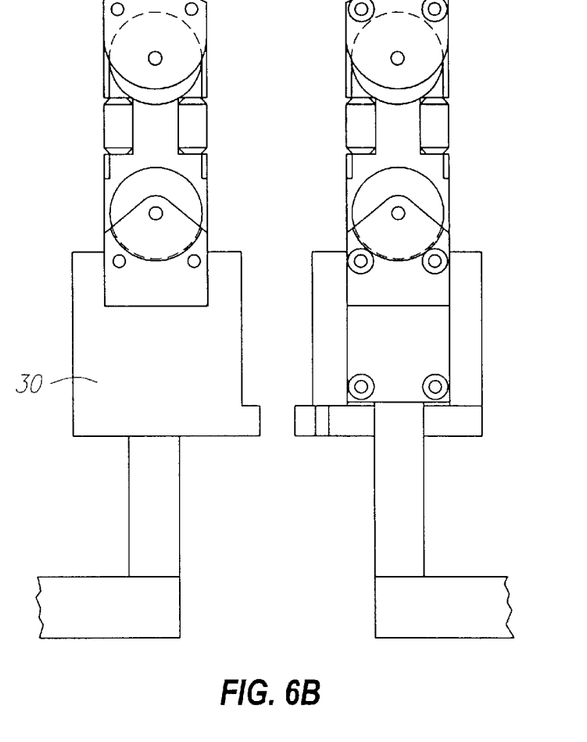
FIG. 6b) is a side view corresponding to that in FIG. 5, wherein only respective halves of two tandem trolleys adjacent to each other are depicted, said halves being provided with coupling members facing each other accordingly.
Figures 6C, 6D:
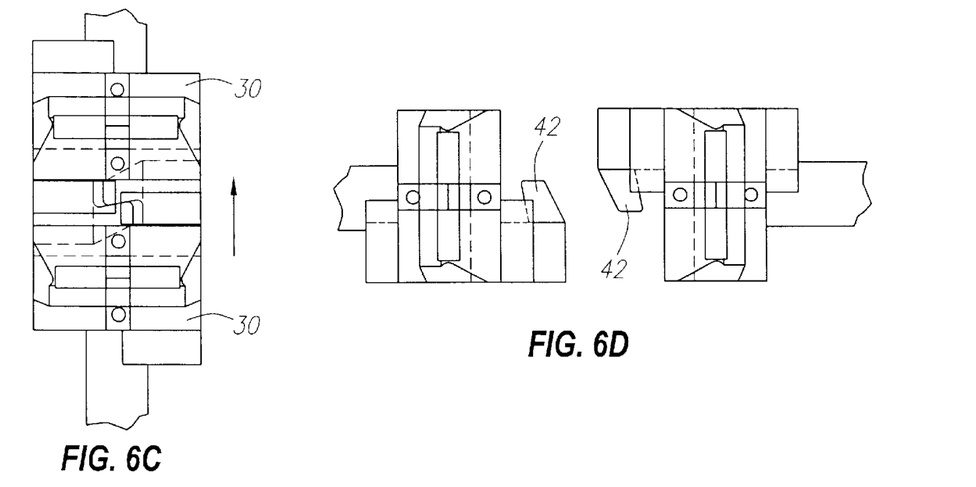
FIG. 6c) shows interlocked coupling members of adjoining tandem trolleys.
FIG. 6d) illustrates adjoining coupling members not yet engaging each other.

FIG. 6a) is a front view of a tandem trolley illustrated in the side view according to FIG. 5, while FIG. 6b) shows two roller devices 4 of two adjoining tandem trolleys, which roller devices 4 can be coupled to each other by means of the coupling members 30, as shown in the plan view according to FIG. 6c). FIG. 6d) is a plan view of the coupling members 30 in their disengaged position; this Figure in particular illustrates the coupling hooks 42 arranged to engage each other in order to take the coupled position depicted in FIG. 6c). In this manner, a plurality of tandem trolleys can be coupled to each other to form a long chain.

Figure 7A:
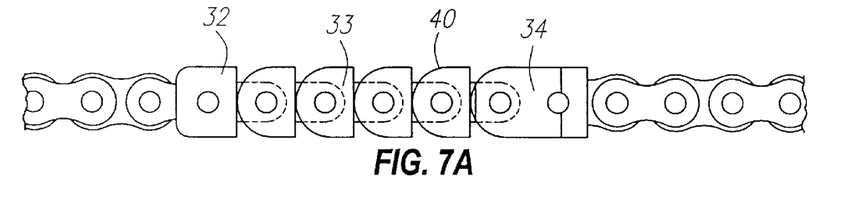
FIG. 7a) is a partial side view of another embodiment.

FIG. 7a) represents a side view of another embodiment. Like in the embodiment already shown in FIG. 3, the driver element 36 is again formed as a link plate mounted to the drive chain 16 in a vertically displaceable fashion. The drive receiving element 11 is arranged as a rotatable drive receiving reel. Beside the driver recess 37, the driver element 36 comprises an inclined pass ramp 38 allowing the driver elements 36 to be readily overtaken by the roller devices 4. Like in the other embodiments, an oblique lifting ramp 39 for lifting the driver element 13 upon abutment is disposed at the leading end of driver element 36. The trailing end of the link plate forming the driver plate is provided with an oblique pass ramp 31, owing to which the driver element 36 can be overtaken, or passed, by the roller devices 4 if the driver element 36 is at a standstill while the roller devices are pushed on by hand, on the analogy of the driver element 13 already described with reference to FIG. 3.

Figure 7B:
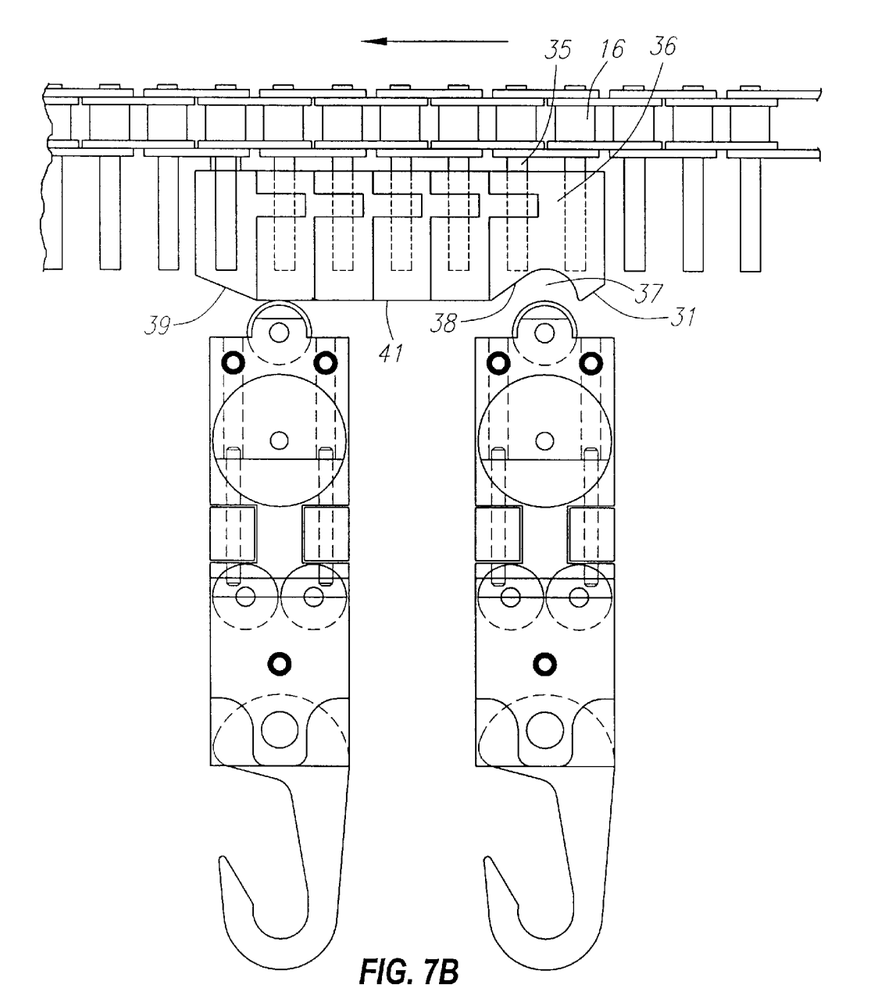
FIG. 7b) is a partial bottom view of the embodiment shown in FIG. 7a), with the roller devices omitted, however.
Figure 7C:
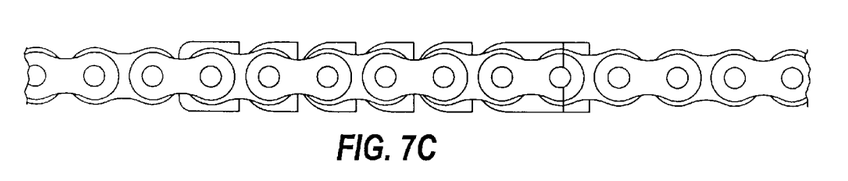
FIG. 7c) is a partial plan view of the embodiment shown in FIG. 7a), with the roller devices omitted, however.

FIG. 7b) is a partial bottom view and FIG. 7c) is a partial plan view of the embodiment shown in FIG. 7a); however, the roller devices are not illustrated in FIGS. 7b) and 7c), and only the drive chain 16 and one driver element 36 are shown. As apparent from the Figure, the individual links 32, 33 and 34 of the driver element 36 are supported in a pivotable and vertically displaceable manner by pins 35 fixed to the drive chain 16, and the links 33 and 34 are each provided with a curvature 40 such as to be readily pivotable with respect to each other. The number of links 33 may be chosen according to the desired length of the glider surface 41.

Figure 8A:
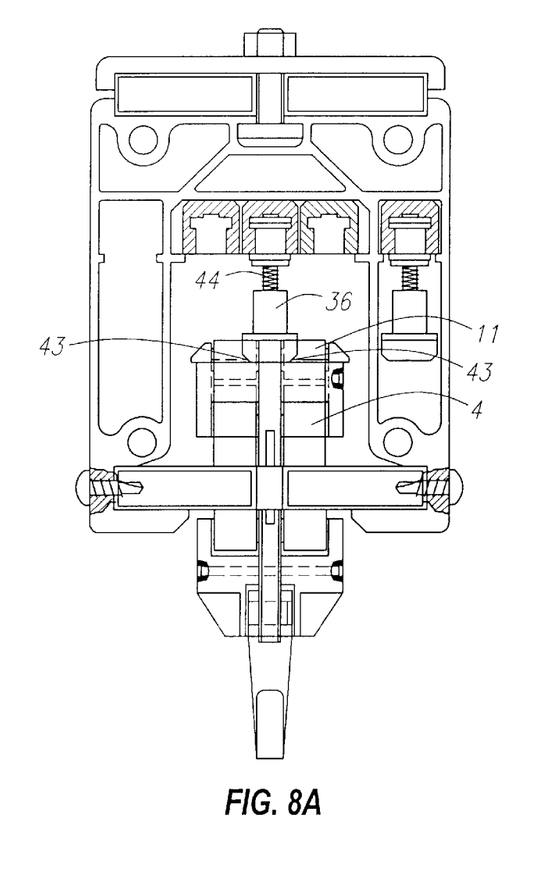
FIG. 8a) is a sectional view corresponding to that of FIG. 2b), with a driver element engaging a roller device.
Figure 8B:
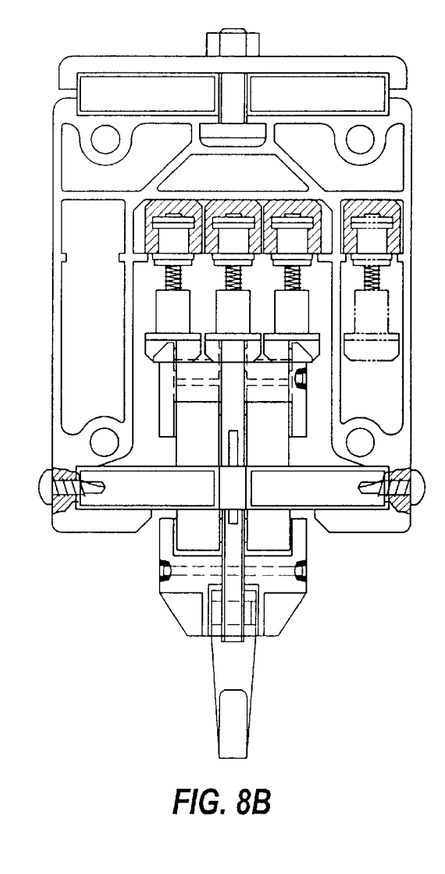
FIG. 8b) is a sectional view corresponding to that of FIG. 8a), but with three driver elements running in parallel.

FIGS. 8a) and 8b) represent sectional views corresponding to the sectional view shown in FIG. 2b), wherein a front view of the driver element 36—depicted in FIG. 7a), for example—and a front view of a roller device 4 are illustrated. As can be seen, the drive receiving element 11 is substantially wider than the driver element 36, thus enabling e.g. three driver elements 36 to be guided in parallel simultaneously, as shown in FIG. 8b). In this way, driver elements from three different paths branching from each other may be guided on a path section as that designated G-H in FIG. 1, for example.

As is further apparent from FIGS. 8a) and 8b), the driver elements are provided with lateral lifting ramps 43 to the left and to the right. Owing to this design feature, driver elements arriving from different paths may get out of each other's way in the intersection areas.

In addition, FIGS. 8a) and 8b) show compression coil springs 44 biasing the driver elements downwardly to ensure a reliable operation.

Figure 9:
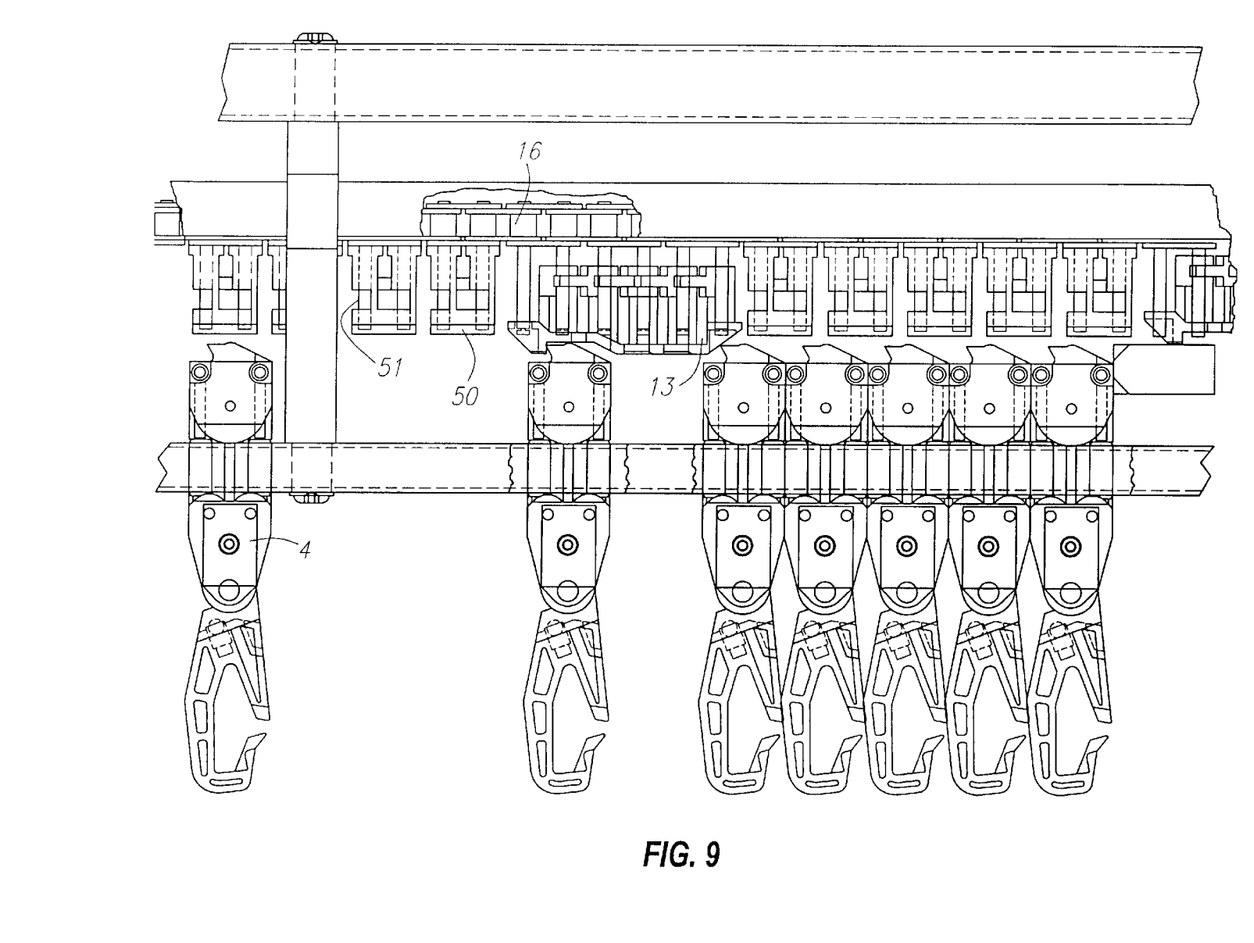
FIGS. 9 and 10 illustrate still another advantageous embodiment, in which additional driver blocks are mounted on the drive chain between the driver elements.
Figure 10:
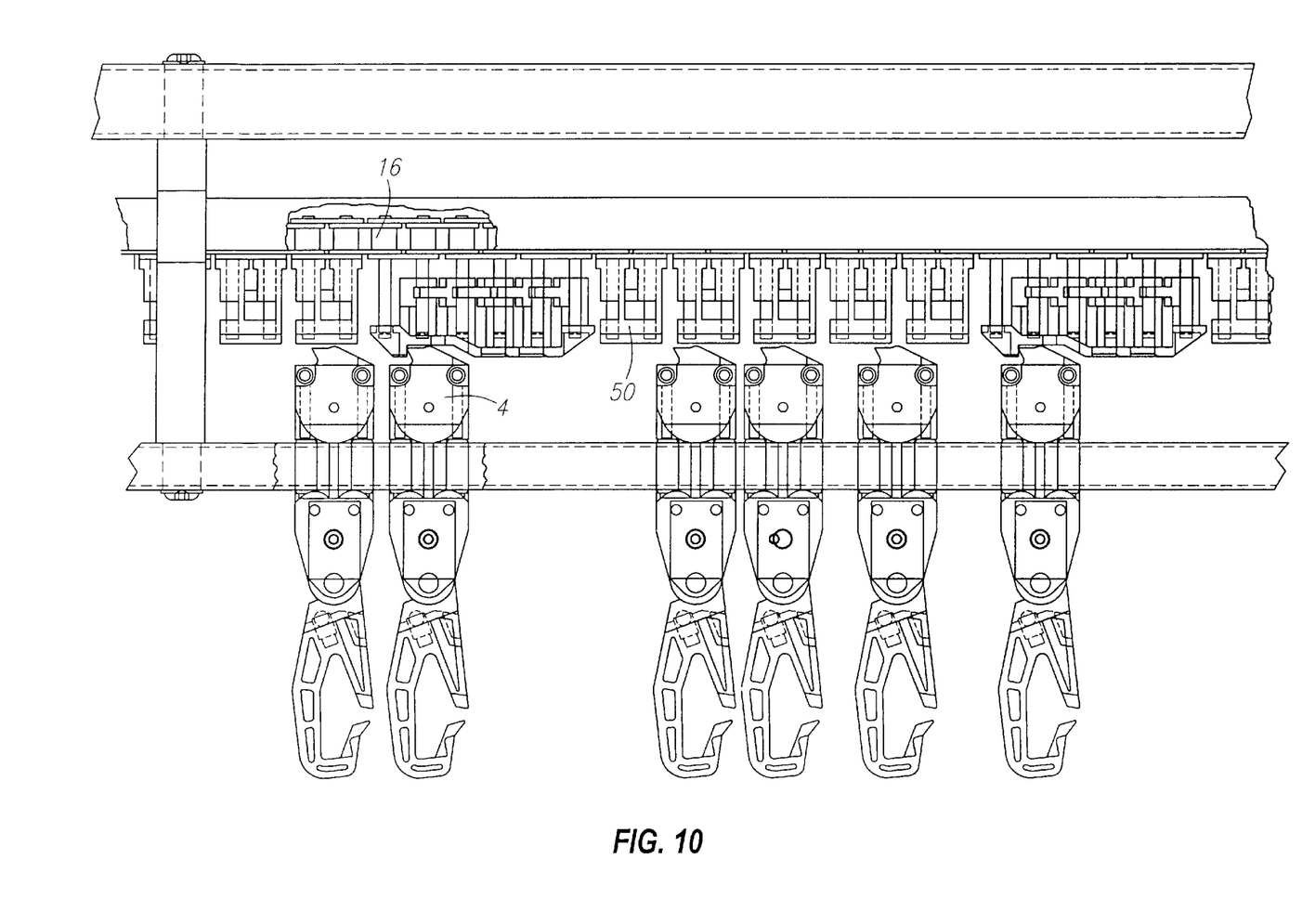

As can be seen in particular in FIG. 3, the driver elements 13 are arranged at intervals on the drive chain 16, said intervals being determined by the thickness of the conveyed articles as measured in the conveying direction. On the other hand, when a roller device is diverted at a branch point of the rail system, e.g. at branch point G-H in FIG. 1, from one conveyor path to another conveyor path each associated with a different drive chain 16, requiring the roller device to be transferred from the first drive chain to the other one, then the presence of the intervals between the driver elements 13 may result in that the respective driver element 13 of the second drive chain has not yet arrived at the branch point when the roller device to be diverted has already been released from the first drive chain. In order to prevent the diverted roller device from clogging the branch point for succeeding roller devices 4, the embodiment according to FIGS. 9 and 10 is preferably provided. In this embodiment, additional driver blocks 50 are fixed to the drive chain 16 between the driver elements 13 and are supported by the chain pins 51 projecting from one side of drive chain 16. As shown in FIG. 9, the bottom surfaces of the driver blocks 50 are arranged at a distance above the bottom surfaces of the driver elements 13 in the lowered position of the driver elements 13; thus, the bottom surfaces of the driver blocks 50 are normally arranged at a distance above the top surfaces of the roller devices 4 as well. If, however, the drive chain is lowered, in particular in the area of a switch, by said distance or slightly more, then the driver blocks 50 will also be lowered by said distance so that the roller devices 4 can be also entrained by driver blocks 50 cooperating with the top surface of the roller devices. This can be seen in FIG. 10. Preferably, at least the lower ends of the driver blocks are designed to yield resiliently such as to be somewhat compressed resiliently when they engage the top side of the roller devices substantially by friction.

We claim:

1. A suspension conveyor installation comprising roller devices (4) individually displaceable on rails of a rail system, and a drive chain (16) routed along said rail system above the rails (8), the bottom side of the drive chain (16) having driver elements (13,36) for engaging respective drive receiving elements (11) arranged on the top faces of the roller devices (4), wherein in an engaged position a driver element (13,36) engages a respective drive receiving element (11) while being disengaged from the drive receiving element (11) in a disengaged position, characterised in that the driver elements (13,36) are arranged as driver plates in the form of link plates mounted to the drive chain (16) such as to be collectively displaceable vertically upwards toward the drive chain (16), with the links (14) of the link plates being linked and pivotable with respect to each other about vertical axes perpendicular to the drive chain (16);

the length of the driver elements (13,36), as measured in the conveying direction, exceeds the dimension of the roller devices (4) as measured in the conveying direction, the bottom edge of each driver element (13,36) comprises: an oblique lifting ramp (18,39), arranged at the leading end of the driver element (13,36) and descending against the conveying direction, for lifting the driver element (13,36) upon abutment; a glider surface (19,25,41), adjoining the lifting ramp (18,39) and extending in the conveying direction, for maintaining the driver element (13,36) lifted; and a driver recess (20,37), adjoining the glider surface (19,25,41), for receiving the drive receiving element (11) of a respective roller device (4);

such that the disengaged position is established or maintained, respectively, by the lifting ramp (18,39) abutting onto an obstacle or an adjacent roller device (4), and by the glider surface (19,25,41) gliding on said obstacle or on the top end of an adjacent roller device (4).

2. The suspension conveyor installation according to claim 1, characterized in that the drive receiving element (11) is designed as a drive receiving projection projecting upwardly from the top end of the associated roller device.

3. The suspension conveyor installation according to claim 2, characterised in that a gliding pin (27) extending transversely to the conveying direction is embedded at the upper vertex of the drive receiving projection (11), for cooperation with the glider surfaces (19,25,41) of the driver elements (13).

4. The suspension conveyor installation according to claim 2, characterised in that starting from the leading end of the respective driver element (13), the lifting ramp (18) and the adjoining glider surface (19) are followed by an oblique pass ramp (21) descending in the conveying direction, and further followed by a hook-shaped driver projection (28), with the driver recess (20) extending between the pass ramp (21) and the driver projection (28).

5. The suspension conveyor installation according to claim 1, characterised in that a second lifting ramp (23) descending obliquely in the conveying direction, for lifting the hook upon abutment, is disposed at a trailing end of the respective driver element (13) behind the driver hook.

6. The suspension conveyor installation according to claim 1, characterised in that lateral lifting ramps (43), for lifting the driver element (13,36) upon abutment, are provided extending along lateral bottom edges of the respective driver element (13,36).

7. The suspension conveyor installation according to claim 1, characterised in that two respective roller devices (4) are connected to each other by a lower connecting rod (29) to form a tandem trolley, and that the drive receiving elements (11) of both roller devices (4) are each designed as a hook-like drive receiving projection (11) facing obliquely towards the centre of the tandem trolley.

8. The suspension conveyor installation according to claim 7, characterised in that the roller devices (4) are connected to the connecting rod (29) through coupling members (30) adapted to engage corresponding coupling members (30) of adjacent tandem trolleys in order to form a chain of tandem trolleys.

9. The suspension conveyor installation according to claim 1, characterised in that the width of the drive receiving element (11), as measured perpendicularly to the conveying direction and the drive chain (16), is at least twice the width of the driver element (13,36).

10. The suspension conveyor installation according to claim 1, characterised in that driver blocks (50) are fixed to the drive chain (16) between the spaced driver elements (13); that the bottom surfaces of the driver blocks (50) are arranged at a distance above the bottom surfaces of the driver elements (13) in the engaged position of the driver elements (13); and that in the areas of switches (3), the drive chain (16) circulates at a level lowered to such an extent that the bottom surfaces of the driver blocks (50) are somewhat lower than the top ends of the roller devices (4), allowing a roller device (4) being passed by a driver block (50) to be entrained by said driver block (50).

11. The suspension conveyor installation according to claim 10, characterised in that at least the lower ends of the driver blocks (50) are designed to yield resiliently.

* * * * *